United States Patent [19]

Huggins

[11] Patent Number: 4,931,636

[45] Date of Patent: Jun. 5, 1990

[54] TWO WAVELENGTH OPTICAL SENSOR AND SENSING SYSTEM

[75] Inventor: Raymond W. Huggins, Mercer Island, Wash.

[73] Assignee: The Boeing Company, Seattle, Wash.

[21] Appl. No.: 237,307

[22] Filed: Aug. 26, 1988

[51] Int. Cl.⁵ .............................................. G01J 3/50
[52] U.S. Cl. ................................ 250/226; 250/227.18; 250/231.1
[58] Field of Search .................... 250/226, 227, 231 R, 250/231 SE; 350/96.10

[56] References Cited

U.S. PATENT DOCUMENTS

| | | | |
|---|---|---|---|
| 3,963,351 | 6/1976 | Chance et al. | 250/231 SE |
| 4,162,399 | 6/1979 | Hudson | 250/231 SE |
| 4,223,216 | 9/1980 | Quick et al. | 250/226 |
| 4,281,245 | 7/1981 | Brogardh et al. | 250/227 |
| 4,291,976 | 9/1981 | McMahon | 250/227 |
| 4,342,919 | 8/1982 | Brogardh | 250/577 |
| 4,345,482 | 8/1982 | Adolfsson et al. | 250/221 |
| 4,356,395 | 8/1982 | Miller | 250/227 |
| 4,362,358 | 12/1982 | Hafle | 250/227 |
| 4,446,366 | 5/1984 | Brogardh et al. | 250/226 |
| 4,465,928 | 8/1984 | Breslow | 250/231 SE |
| 4,492,860 | 1/1985 | Brogardh et al. | 259/227 |
| 4,514,860 | 4/1985 | Adolfsson et al. | 250/227 |
| 4,529,875 | 7/1985 | Brogardh et al. | 250/231 R |
| 4,547,729 | 8/1985 | Adolfsson et al. | 324/96 |
| 4,592,664 | 6/1986 | Bijlenga et al. | 250/227 |
| 4,652,747 | 3/1987 | Ellis | 250/226 |
| 4,691,192 | 9/1987 | Baker | 250/231 SE |
| 4,698,616 | 8/1987 | Krohn et al. | 250/231 SE |
| 4,705,943 | 11/1987 | Charlton | 250/237 C |
| 4,740,688 | 4/1988 | Edwards | 250/227 |

FOREIGN PATENT DOCUMENTS

| | | |
|---|---|---|
| 2237032 | 3/1973 | Fed. Rep. of Germany . |
| 60-169714 | 3/1985 | Japan . |
| 2065297 | 6/1981 | United Kingdom . |

*Primary Examiner*—David C. Nelms
*Attorney, Agent, or Firm*—Christensen, O'Connor, Johnson & Kindness

[57] ABSTRACT

A sensor for determining the value of a measurand, such as the rotational position of a shaft (32). The sensor includes a wavelength sensitive beamsplitter (44), an encoder (30), and a wavelength sensitive modulator (48). A beamsplitter receives an optic input signal (60) having first (80) and second (82) wavelength bands, and forms the input signal into first (62) and second (64) beams corresponding to the wavelength bands. The encoder includes a track (36). The modulator preferentially modulates the intensity of light in the first wavelength band in comparison to light in the second wavelength band. The first beam is modulated by the encoder to form a modulated first beam (66), and the second beam is modulated by the modulator to form a modulated second beam (68). A differential embodiment is also provided in which the encoder comprises a pair of mechanically coupled tracks, one track modulating each beam.

18 Claims, 6 Drawing Sheets

INPUT BEAM 60

TRANSMITTED BEAM 62

REFLECTED BEAM 64

BEAM 70

BEAM 68

BEAM 72

TWO WAVELENGTH OPTICAL SENSOR AND SENSING SYSTEM

FIELD OF THE INVENTION

The present invention relates to optical sensors and, in particular, to a two-wavelength optical sensor and sensing system that may be used to determine the position of a movable member.

BACKGROUND OF THE INVENTION

In one known type of optical sensor, an encoder is attached to a movable member, and the position of the member is determined by optically interrogating the encoder. The member may be one that rotates, in which case the encoder may comprise a disk that rotates with the member, or may be linearly movable, in which case the encoder moves linearly along with the member. In an analog encoder, the encoder includes a track that has a continuously variable optical property, such as a continuously variable transmission coefficient. In a digital encoder, on the other hand, the encoder includes a number of parallel coded tracks, each of which represents a specific bit of a binary word. For each position of the encoder, the tracks will present a different binary word to the optical interrogation system.

In the past, analog encoder tracks have typically been manufactured by depositing a variable density metallic attenuating film on a transparent disk or plate. The linearity of commercially available analog encoders manufactured by such a technique has generally been limited to about 5%. Analog optical encoders have therefore not been competitive with digital encoders, where the precision is limited only by the highest achievable bit density of the least significant track.

In a fiber-optic analog encoder system, optical energy is transmitted to and from the encoder by optical fibers. Optical fiber couplers are used to connect the optical fibers to one another, and to the other components of the sensor system. The couplers allow each fiber path to be constructed from several discrete lengths of optical fiber. Such couplers have insertion losses that are neither negligible nor exactly reproducible. Since the optical attenuation of the fiber-optic link is an unknown and variable factor, the attenuation of the fiber link must be known before the position of the encoder can be measured solely from an end-to-end attenuation measurement. Alternatively, the optical modulation technique inside the sensor must be such that the position of the encoder can be found independently of the fiber link losses.

One method of making an attenuation measurement inside the sensor that is independent of fiber link losses employs wavelength division multiplexing. Light of two or more wavelengths is launched into the outgoing fiber, and is demultiplexed inside the sensor. After demultiplexing, light at each wavelength is differentially modulated, recombined, and then transmitted back to a receiver along a single return fiber. At the receiver, light of the two different wavelengths is demultiplexed to yield the intensities at the two or more wavelengths. After suitable signal processing, the attenuation due to the encoder track, and hence the position of the movable member, may be found. When light of two separate wavelengths is used, the system is known as a two-wavelength, referenced sensing system.

SUMMARY OF THE INVENTION

The present invention provides a two-wavelength optical sensing system having a sensor that achieves a high degree of separation between the two wavelengths with a very compact design. The system can therefore be used to provide a highly accurate and efficient optical analog encoder reader.

In a preferred embodiment, the present invention provides a sensor for determining the value of a measurand. The sensor comprises wavelength sensitive beamsplitting means, an encoder, wavelength sensitive modulation means, and optical path means. The beamsplitting means receives an optical input signal having first and second wavelength bands, and forms the input signal into first and second beams. The first beam contains a major portion of the optical input signal in the first wavelength band, and the second beam contains a major portion of the optical input signal in the second wavelength band. The encoder includes means for modulating the intensity of light by an amount that varies as the value of the measurand varies. The modulation means preferentially modulates the intensity of light in the first wavelength band in comparison to light in the second wavelength band. The optical path means includes means for forming signal and reference paths for the respective first and second beams. The arrangement of the paths is such that the first beam is modulated by the encoder to form a modulated first beam, and the second beam is modulated by the modulation means to form a modulated second beam. The relative intensities of the modulated first and second beams provide a measure of the value of the measurand.

In preferred aspects of the invention, the beamsplitting means comprises a short wavelength pass filter having a cutoff wavelength between the first and second wavelength bands. The optical path means further comprises combining means for combining the modulated first and second beams into a single optical output signal. The combining means may also be a short wavelength pass filter having a cutoff wavelength between the first and second wavelength bands. The modulation means comprises a short wavelength, intrinsically absorbing material that transmits a major portion of light in the second wavelength band and absorbs a major portion of light in the first wavelength band. The measurand measured by the system may be the position of a movable member, such as a shaft, in which case the encoder is mechanically coupled to the shaft, and includes a track along which the transmittance varies with the position. The track thereby attenuates the intensity of light passing through the track by an amount that varies as the shaft rotates.

A differential embodiment of the sensor is also provided. In the differential embodiment, the encoder comprises mechanically coupled first and second tracks, with the transmittance varying with position along each track. The optical path means includes means for forming the signal path such that the intensity of the first beam is modulated by the first track to form a modulated first beam. The reference path is formed such that the intensity of the second beam is modulated by the second track and by the modulation means, to form the modulated second beam. Preferably, as the movable member moves, the encoder increases the attenuation of one of the beams and decreases the attenuation of the other beam.

DETAILED DESCRIPTION OF THE INVENTION

Figure 1:
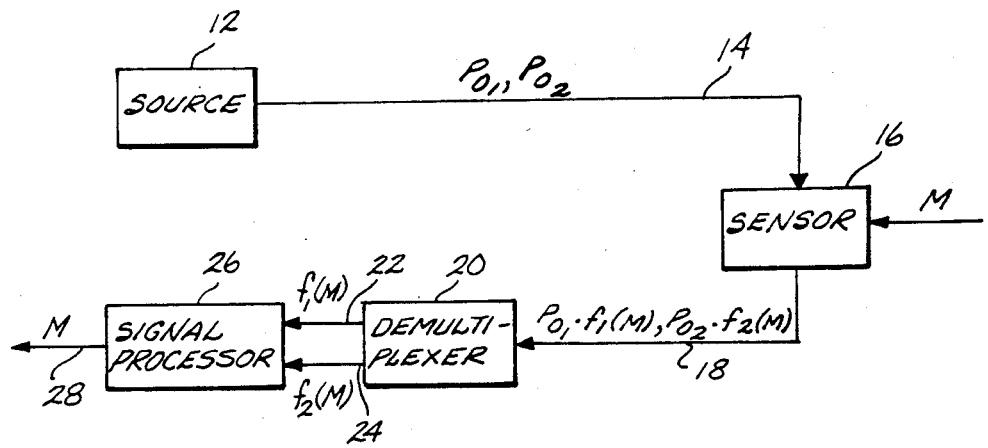
FIG. 1 is a schematic diagram showing the overall arrangement of a sensing system according to the present invention.
Figure 2:
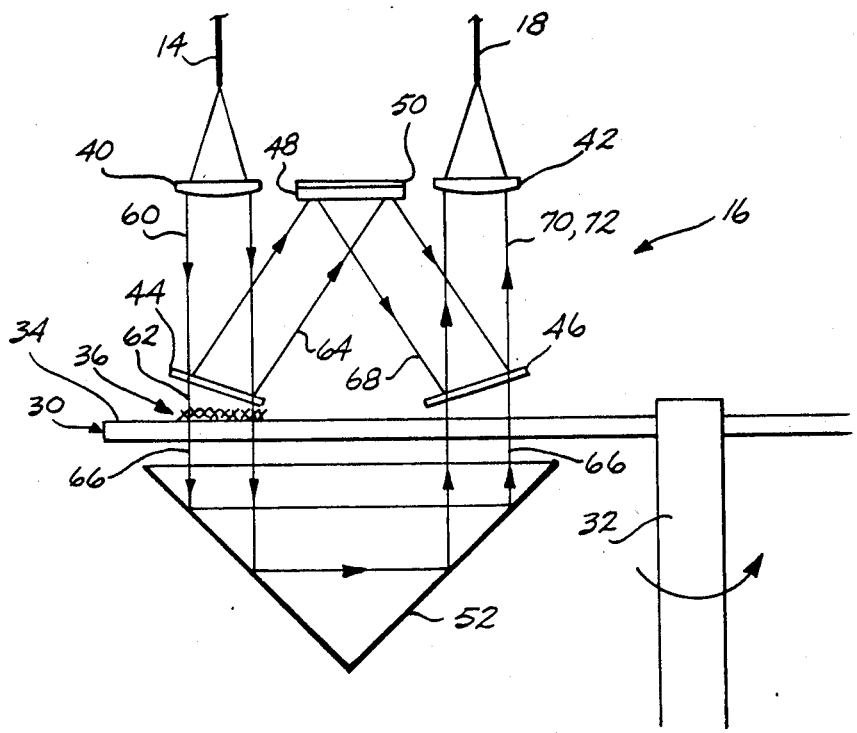
FIG. 2 is an optical diagram showing a first preferred embodiment of the sensor.
Figure 3:
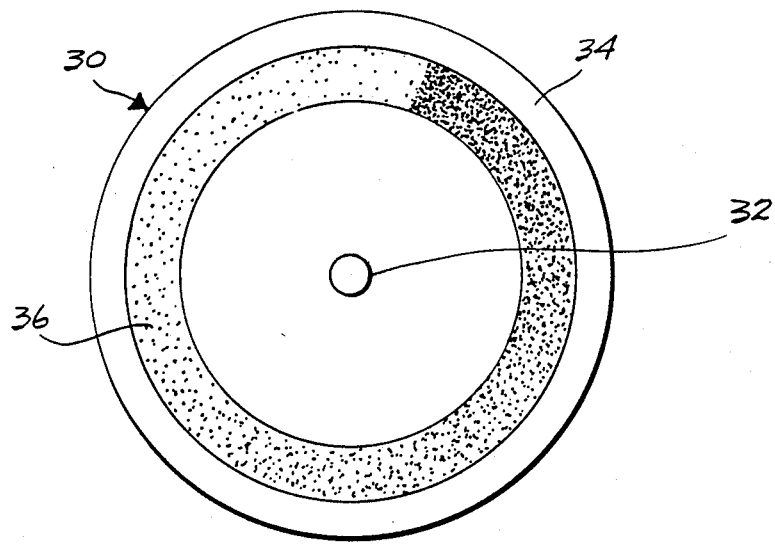
FIG. 3 is a top plan view of the encoder of the FIG. 2 embodiment.

The present invention provides a two-wavelength, referenced sensing system for optically determining the value or other property of a measurand. FIGS. 1-3 illustrate a preferred embodiment of the sensing system, with FIG. 1 showing the overall arrangement, and FIGS. 2 and 3 illustrating a preferred embodiment for the sensor. In FIG. 1, optical source 12 produces an optical input signal on fiber-optic cable 14, the optical input signal containing first and second wavelength bands having optical powers $P_{01}$ and $P_{02}$ respectively. The optical input signal is input to sensor 16, and the sensor modulates the input signal to produce an optical output signal on fiber-optic cable 18. The modulation is a function of a measurand M, the modulation in the first and second wavelength bands being designated $f_1(M)$ and $f_2(M)$, respectively.

The optical output signal on fiber-optic cable 18 is demultiplexed by demultiplexer 20, to produce optical or electrical signals on lines 22 and 24 representing the respective modulation functions $f_1(M)$ and $f_2(M)$. These modulation signals are processed by signal processor 26, to provide an output signal on line 28 indicative of measurand M. In general, source 12 will comprise two optical sources, one for each wavelength band. The optical sources can be alternately pulsed, to produce a time division multiplexed system in which only a single photodetector is required in demultiplexer 20. Alternately, a wavelength division multiplexing system may be employed in which the multiplexer comprises a pair of photodetectors and appropriate wavelength separation devices.

In the embodiment illustrated in FIGS. 2 and 3, sensor 16 comprises a disk-shaped encoder 30, and the measurement M is the rotational position of a shaft 32 to which encoder 30 is attached. Encoder 30 includes a transparent substrate 34 (FIG. 3) having a variable density, annular track 36 superimposed on the substrate. The value of the optical transmission (or reflection) of track 36, as a function of angular position, is known as the "law of the track." The law of the track may be linear, or may have any other predetermined functional form. A preferred technique for making track 36 such that it has a highly accurate attenuation function is set forth in commonly assigned U.S. patent application Ser. No. 131,664, filed Dec. 11, 1987. Other known techniques for making analog encoder tracks may also be used. Other forms of encoders, e.g., linear encoders or sliders, could of course also be used.

Referring again to FIG. 2, the illustrated embodiment of the sensor comprises lenses 40 and 42, short wavelength pass (SWP) filters 44 and 46, long wavelength pass (LWP) filter 48 having mirror 50 formed on one of its surfaces, and right angle prism 52 positioned beneath encoder 30. Lens 40 receives the optical input signal on fiber-optic cable 14, and collimates the input signal to produce collimated input beam 60. As previously described, the input signal (and therefore input beam 60) comprises light in two wavelength bands. Input beam 60 is directed onto SWP filter 44 that is positioned above track 36. The cut-off wavelength of SWP filter 44 is selected such that the filter substantially transmits light in the first (shorter) wavelength band, and substantially reflects light in the second (longer) wavelength band. SWP filter 44 thus functions as a wavelength sensitive beamsplitter, and produces transmitted beam 62 that primarily comprises light in the first wavelength band, and reflected beam 64 that primarily comprises light in the second wavelength band.

Transmitted beam 62 passes through track 36 and substrate 34, and into prism 52. The prism reverses transmitted beam 66, which then passes through a clear portion of encoder 30. Beam 66 then strikes SWP filter 46 that preferably has a cut-off wavelength identical to that of SWP filter 44. Since beam 66 consists principally of light in the first wavelength band, most of beam 66 is transmitted by SWP filter 46, to produce beam 70. Beam 70 is coupled by lens 42 into return fiber-optic cable 18.

Reflected beam 64, consisting primarily of light in the second wavelength band, strikes LWP filter 48 that includes mirror 50 on its back face. Beam 64 is thus transmitted through LWP filter 48, reflected by mirror 50, and retransmitted through LWP filter 48, to produce beam 68 that strikes SWP filter 46. LWP filter 48 comprises wavelength sensitive modulation means that preferentially modulates (e.g., attenuates) light in the first wavelength band relative to light in the second wavelength band. In a preferred embodiment, LWP filter 48 is preferably a short wavelength, intrinsically absorbing filter such as Schott Glass RG 780, which effectively attenuates light in the first wavelength band, and substantially transmits light in the second wavelength band. Since beam 64 primarily comprises light in the second wavelength band, this beam is substantially transmitted by LWP filter 48 and reflected by mirror 50 to produce beam 68. SWP filter 46 is positioned such that it reflects beam 68 to produce beam 72, that is coincident with beam 70. Beam 72 is coupled by lens 42 into return fiber-optic cable 18. It will be noted that as a result of the symmetrical arrangements shown in FIG. 5, the input and output of the sensor could be reversed, i.e., fiber-optic cables 14 and 18 could be switched without affecting the operation of the device.

Figure 4A:
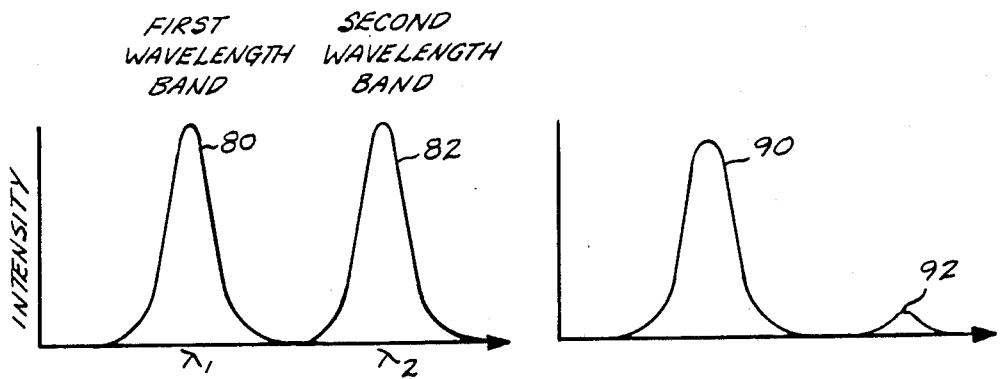
FIGS. 4A, 4B, 4C, 4D, 4E and 4F are graphs showing optical signal intensities at various positions in the sensor.
Figure 4B:
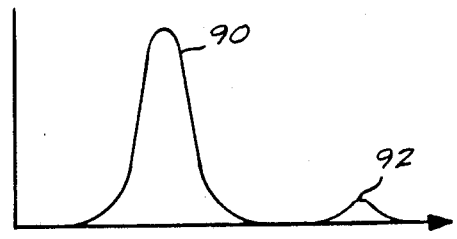

The effect of the optical arrangement shown in FIG. 2 can be described with respect to FIGS. 4A-4F and 5. FIG. 4A illustrates the intensity versus wavelength profile of the optical input signal on fiber-optic cable 14 and in beam 60. The optical input signal comprises first wavelength band 80 centered at wavelength $\lambda_1$ and second wavelength band 82 centered at wavelength $\lambda_2$. FIG. 4A indicates that the first and second wavelength bands have equal intensities although this need not necessarily be the case.

Figure 5:
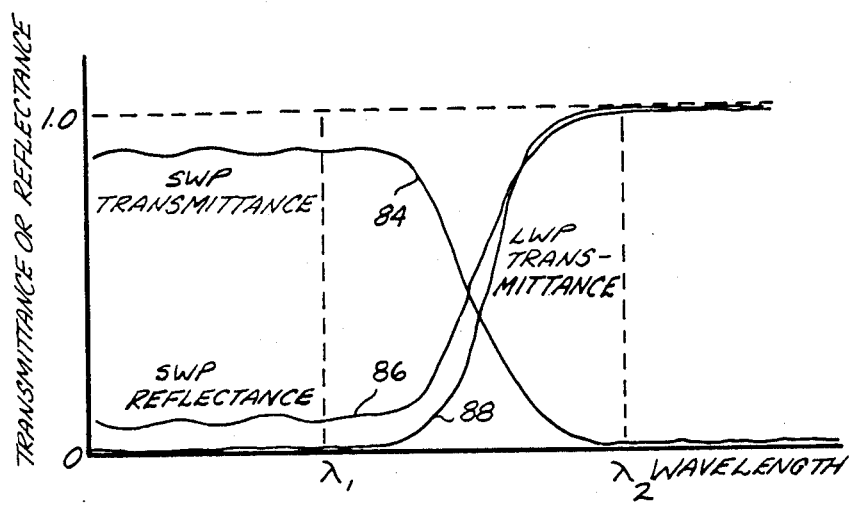
FIG. 5 is a graph showing the properties of filters used in the sensor.

Referring to FIG. 5, curve 84 represents the transmittance of each of SWP filters 44 and 46, and curve 86 represents the reflectance of each of the SWP filters. In a preferred embodiment in which each SWP filter is an interference filter, there is very little loss or absorption in the SWP filter, and curves 84 and 86 sum substantially to unity. FIG. 5 also includes curve 88 that represents the transmittance of LWP filter 48. In this case, light not transmitted by the LWP filter is absorbed rather than reflected.

Referring again to FIG. 2, input beam 60 strikes SWP filter 44, to produce transmitted beam 62 and reflected beam 64. Referring to FIG. 5, it may be seen that in the first wavelength band centered at $\lambda_1$, approximately 90% of the energy of input beam 60 will be transmitted by SWP filter 44, while the remaining fraction of the input beam energy in the first wavelength band will be reflected. FIG. 5 also illustrates that nearly 100% of the input beam energy in the second wavelength band 82 is reflected by SWP filter 44. As a result, beams 62 and 64 have the approximate intensity profiles shown in FIGS. 4B and 4C, respectively. The transmitted beam 62 consists of a large component 90 in the first wavelength band, and a very small component 92 in the second wavelength band. On the other hand, reflected beam 64 consists of a large component 96 in the second wavelength band, and a small but not negligible component 94 in the first wavelength band. In FIGS. 4B-4F, the peak heights are not drawn to scale, but have been varied for the purposes of illustration.

Figure 4C:
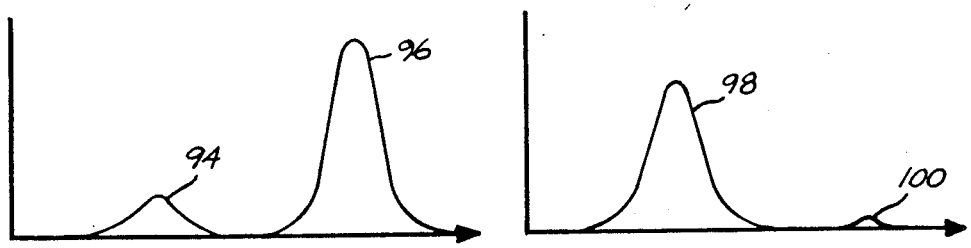
Figure 4D:
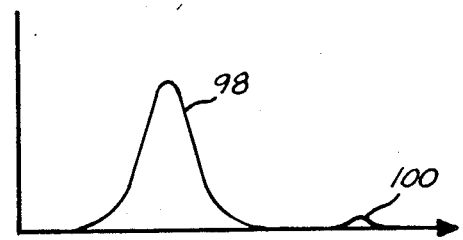

Transmitted beam 62 passes through track 36 to produce modulated beam 66. The modulated beam is reversed by prism 52, passed through a clear portion of encoder 30, and strikes SWP filter 46. The portion of beam 66 that is transmitted by SWP filter 46 is designated by reference numeral 70. Assuming for the moment that beam 62 is not attenuated by track 36, beam 66 then has approximately the same spectral profile as beam 62. When this beam is incident onto SWP filter 46, light in the first wavelength band is substantially transmitted, and light in the second wavelength band is substantially reflected, to produce the spectral profile for beam 70 shown in FIG. 4D. For beam 70, component 98 in the first wavelength band is smaller than component 90 of FIG. 4B, because light in the first wavelength band of beam 70 has now passed through two SWP filters, each of which transmits only about 90% of the energy in the first wavelength band. Peak 100 in FIG. 4D is essentially zero, having been attenuated by two SWP filters.

Figure 4E:
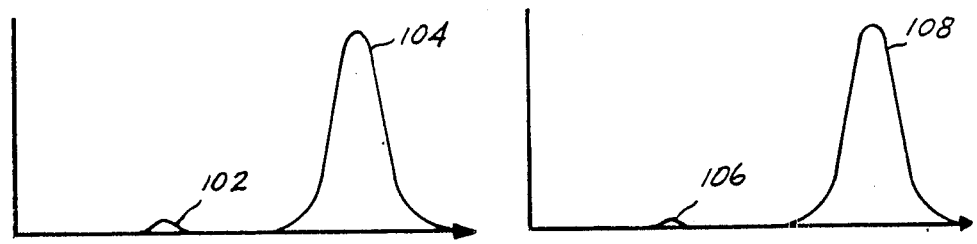

Reflected beam 64 makes two passes through LWP filter 48 to produce beam 68. The spectral profile of beam 68 is as shown in FIG. 4E. The relatively small amount of light in the first wavelength band of beam 64, represented by peak 94 in FIG. 4C, is almost entirely attenuated by LWP filter 48, to produce a very small component 102 in beam 68. In contrast, the energy in peak 96 shown in FIG. 4C is almost entirely transmitted by the LWP filter, resulting in a large component 104 in the second wavelength band for beam 68.

Figure 4F:
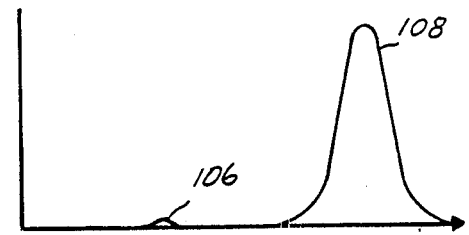

Beam 68 is reflected by SWP filter 46 to produce beam 72. SWP filter 46 is oriented such that beam 72 is coincident with beam 70. SWP filter 46 substantially transmits the very small amount of energy left in peak 102 to produce a lower level peak 106 in the first wavelength band, as shown in FIG. 4F. In the second wavelength band, the SWP filter reflects substantially all of the energy to produce peak 108. By comparing FIGS. 4D and 4F, it may be seen that a high degree of separation has been achieved between the two wavelength components. Selective attenuation of beam 62 by track 36 reduces the height of peak 98 with respect to peak 108, and this relative height may be analyzed to accurately determine the position of the encoder and of the shaft to which it is attached.

The separation between wavelengths $\lambda_1$ and $\lambda_2$ (along the wavelength axis) should be as small as possible, subject to the adequate transmission or attenuation by the filters, in order to minimize differential attenuation in the fiber-optic cables due to the fiber attenuation characteristics, and to avoid differential attenuation in the connectors due to modal effects. The optical design shown in FIG. 2 is such that the light in the two wavelength bands passes through or is reflected by each filter twice, thus increasing the degree of isolation between the two channels, and allowing a smaller difference between the two wavelengths.

Figure 6:
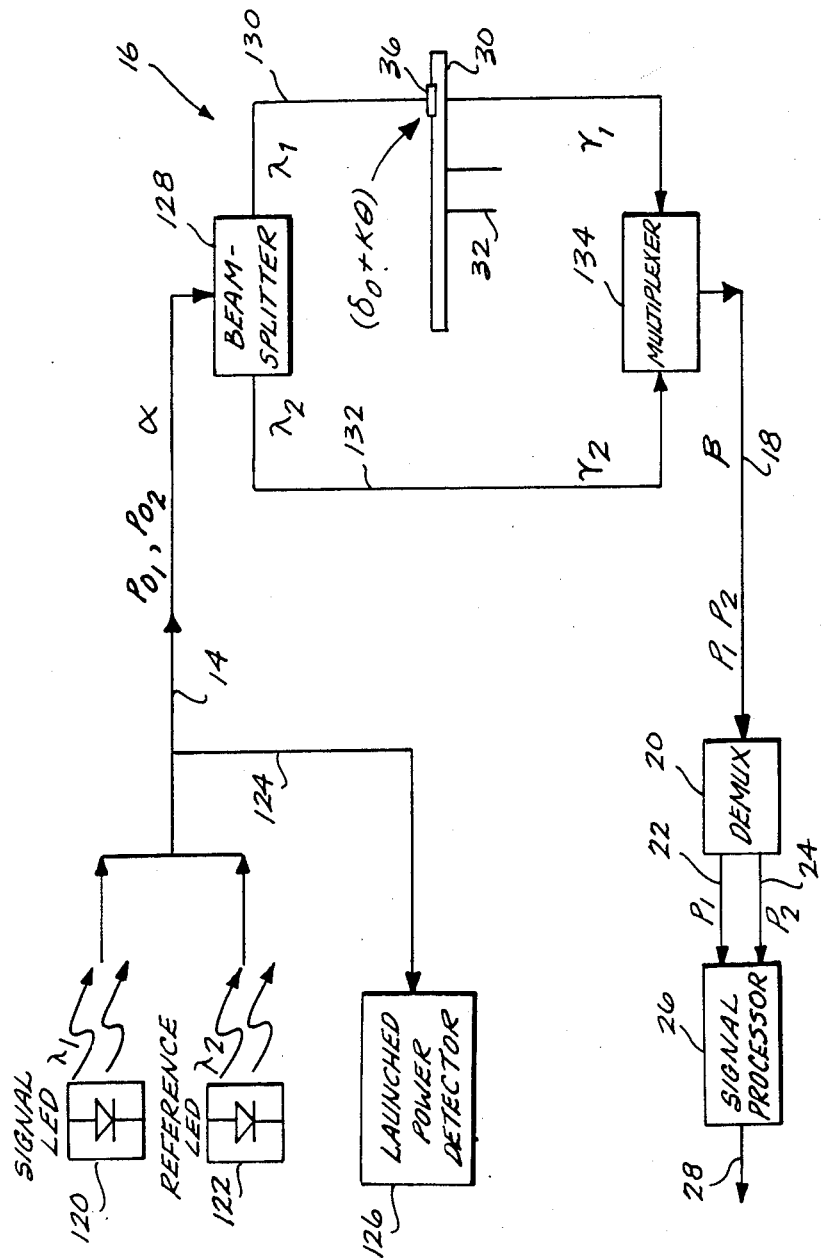
FIG. 6 is a schematic signal diagram of the sensing system.

FIG. 6 presents a simplified optical schematic diagram of the sensor system shown in FIGS. 1-3. Signal LED 120 and reference LED 122 launch light in respective first and second wavelength bands into fiber-optic cable 14. The center wavelengths $\lambda_1$ and $\lambda_2$ are used to represent the respective wavelength bands, and the optical powers launched in the two wavelength bands are designated $P_{01}$ and $P_{02}$, respectively. A small fraction (e.g., 5%) of the launched light is extracted onto fiber-optic cable 124, and conveyed to launched power detector 126 that provides signals indicating the net launched power in each wavelength band. Such signals may be determined by wavelength division multiplexing techniques wherein the signal on fiber-optic cable 124 is demultiplexed by optical filters or the like, or by time division multiplexing techniques wherein LEDs 120 and 122 are alternately pulsed. At sensor 16, light from fiber-optic cable 14 is demultiplexed by wavelength sensitive beamsplitter 128 (e.g., SWP filter 44), such that all light in the first wavelength band follows signal path 130, while all light in the second wavelength band follows reference path 132. Light traveling along signal path 130 is attenuated by track 36, while light traveling along reference path 132 is not attenuated by the encoder. Light traveling along the signal and reference paths is combined by multiplexer 134 (e.g., SWP filter 46) onto return fiber-optic cable 18. The optical powers in the two wavelength bands on the return fiber-optic cable are designated $P_1$ and $P_2$, respectively. These power levels are demultiplexed by demultiplexer 20 to produce separate signals on lines 22 and 24 representing $P_1$ and $P_2$ respectively, and $P_1$ and $P_2$ signals are processed by signal processor 26 to produce a signal on line 28 that indicates the position of shaft 32. As with the launched power detector, demultiplexer 20 may utilize either time or wavelength division techniques.

Fiber-optic cables 14 and 18 are assumed to have losses from all sources of $\alpha$ and $\beta$, respectively, and these losses are assumed to be independent of wavelength. Signal path 130 (with the encoder removed) and reference path 132 are assumed to produce attenuations of $\gamma_1$ and $\gamma_2$, respectively, and the track is assumed to have a transmission characteristic of $\delta_o + k\theta$, where $\delta_0$ is a minimum attenuation at one end of the track, k is the track constant, and $\theta$ is the angle of rotation. The powers $P_1$ and $P_2$ can then be written as:

$$P_1 = P_{01}\alpha\beta\gamma_1(\delta_0 + k\theta) \tag{1}$$

$$P_2 = P_{02}\alpha\beta\gamma_2 \tag{2}$$

Taking the ratio of the two received powers and solving for $\theta$ gives:

$$\theta = \frac{1}{k}\left[\frac{P_1/P_2}{P_{01}/P_{02}} G - \delta_0\right] \tag{3}$$

where $G = \gamma_2/\gamma_1$, and k is a constant. The angle $\theta$ is therefore seen to be independent of the wavelength independent losses in the fiber lines coupling the sources and signal-processing components to the sensor.

One of the goals of a practical sensor system is the interchangeability of sensors, without recalibration. The parameters k and $\delta_0$ are functions of the encoder, can be tightly controlled by the encoder manufacturing process. The remaining variables are the losses of the signal and reference paths. Referring to Equation (3) above, it may be seen that the ratio G of the two losses must be the same for every sensor. Small variations in the loss of either path can be accommodated by introducing a small but variable loss into one of the paths. This small, variable loss can be adjusted to set the ratio G to equal a predetermined value. In practice, a small loss may be introduced into the reference path 132 by varying the angle of LWP filter 48/mirror 50, or by placing a small, movable obstruction into the reference path. For the purpose of setting up the parameter G, the encoder disc may have a transparent area, and $\delta_0$ may be set by controlling the angle of the encoder track relative to a fiducial mark on the shaft.

It is important that the modal distribution of the two different wavelength bands present in fiber-optic cable 14 just prior to sensor 16 is preserved. This modal distribution should be relatively unchanged after the optical power at the two wavelengths is launched into return fiber-optic cable 18. To meet this requirement, the length of the signal and reference path should be equal, and both paths should be unobscured. Exceptions to the latter requirement include the introduction of an obstruction into one of the paths, for adjustment purposes, and a noncircular geometry of the LWP filter/mirror, which may be necessary due to limited available space.

Figure 7:
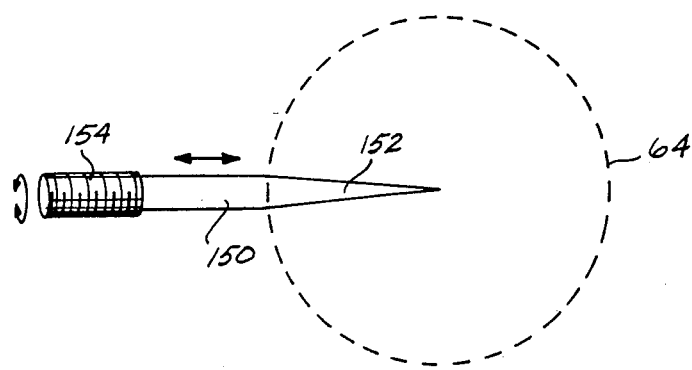
FIG. 7 illustrates the use of an obstruction to introduce a small amount of attenuation into one of the optical paths.

FIG. 7 illustrates the geometry of an obstruction that does not significantly alter the modal distribution of the beam in which the obstruction is placed. In particular, FIG. 7 illustrates obstruction 150 that may be placed in the reference beam, e.g., in reflected beam 64 (see FIG. 2), to attenuate the beam without significantly affecting its modal distribution. Obstruction 150 has a tapering tip 152 that has a cross section corresponding to a pie-shaped sector of the beam cross section. Obstruction 150 also includes means, illustrated by threads 154, for causing small movements of member 150 in the directions indicated by the double-headed arrow in FIG. 7, to adjust the degree of attenuation.

Figure 8:
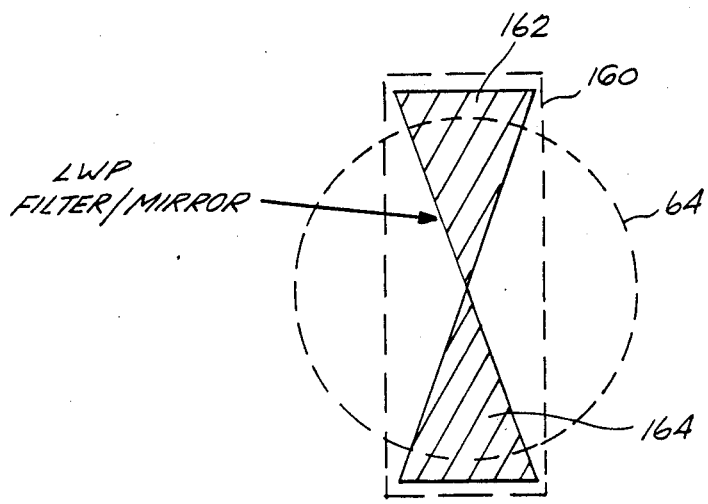
FIG. 8 is a schematic diagram illustrating the shape of one of the filters with respect to the beam in which the filter is placed.

FIG. 8 illustrates a technique for preventing alteration of the modal distribution of the reflected beam 64 for the case in which the available space does not permit use of a circular geometry for LWP filter 48/mirror 50. In FIG. 8, the available space is illustrated by rectangular box 160, and the cross section of the reflected beam is designated by reference numeral 64. The preferred shape for the LWP filter/mirror is illustrated by shaded areas 162 and 164. As in FIG. 7, the LWP filter/mirror segments occupy sector shaped portions of the reflected beam cross section.

Figure 9:
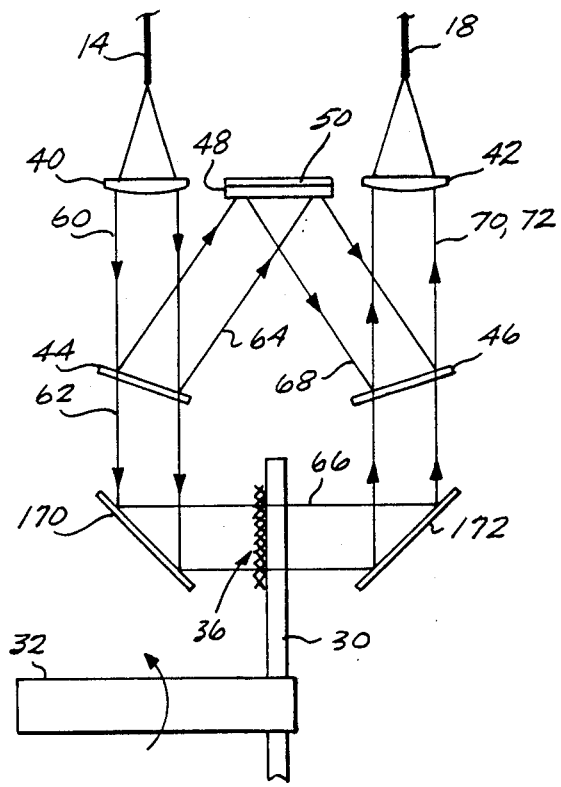
FIG. 9 is an optical diagram showing a second preferred embodiment of the sensor.

A second preferred embodiment of sensor 16 is illustrated in FIG. 9. Because of the similarly of this embodiment to the embodiment shown in FIG. 2, like reference numerals are used for similar parts. In this embodiment, encoder 30 and encoder shaft 32 are oriented at right angles with respect to their orientations in FIG. 2. Transmitted beam 62 is reflected by mirror 170 such that it passes through track 36, and the resulting beam 66 is then reflected by mirror 172 onto SWP filter 46. In this embodiment, light transmitted by SWP filter 44 does not pass through a clear portion of the encoder disc.

Figure 10:
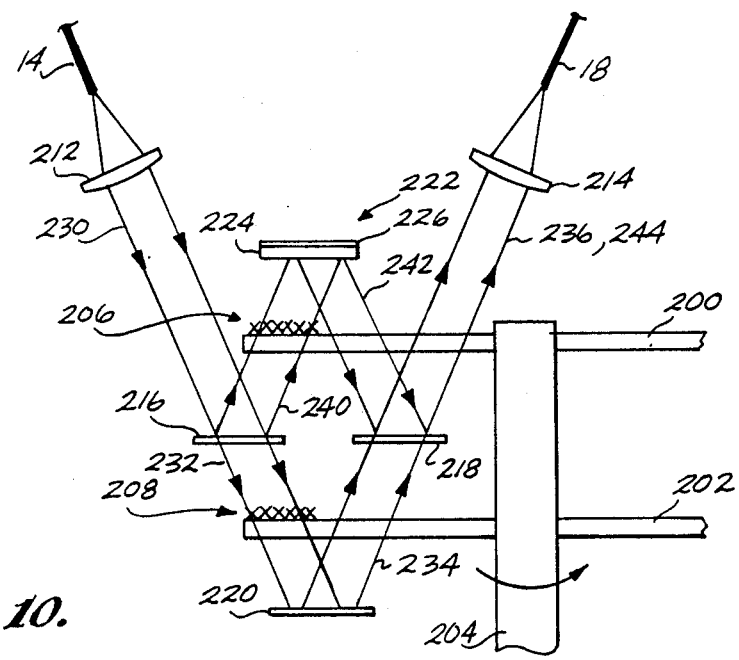
FIG. 10 is an optical diagram showing a third, differential embodiment of the sensor.

A third, differential embodiment of the sensor according to the present invention is illustrated is FIG. 10. In this embodiment, a pair of encoders 200 and 202 are mounted on a common shaft 204. Encoders 200 and 202 include first track 206 and second track 208, respectively, the first and second tracks having respective transmittances $t_1$ and $t_2$ that are given by:

$$t_1 = t_{max} - \theta/\theta_{max}(t_{max} - t_{min}) \tag{4}$$

$$t_2 = t_{max} - (1 - \theta/\theta_{max})(t_{max} - t_{min}) \tag{5}$$

where $t_{max}$ and $t_{min}$ are the maximum and minimum transmittances of the tracks, and wherein it is assumed that the shaft rotation angle $\theta$ can vary between zero and $\theta_{max}$. As illustrated in Equations (4) and (5), the $t_{max}$ and $t_{min}$ values are assumed to be identical to one another for the two encoders, at least to within an amount that is much smaller than the desired precision of the sensor.

The optical configuration for the embodiment of FIG. 10 includes collimating lens 212, focusing lens 214, SWP filters 216 and 218, mirror 220, and mirror/LWP filter 222 that includes LWP filter layer 224 and mirror 226. In operation, lens 212 collimates the light from fiber-optic cable 14 to produce input beam 230 that strikes SWP filter 216. Light transmitted by SWP filter 216, principally comprising light in the first wavelength band centered at $\lambda_1$, passes through track 208 on encoder 202, and is then reflected by mirror 220 back through a clear portion of encoder 202, as beam 234. Since beam 234 principally comprises the first wavelength component, most of this beam is transmitted through SWP filter 218, to form beam 236 that is coupled to outgoing fiber 18 by lens 214.

Light reflected by SWP filter 216 as beam 240 passes through track 206 on encoder 200, is reflected by LWP filter/mirror 222 onto SWP filter 218. Reflected beam 240 consists primarily of light in the second wavelength band, and most of this light is therefore passed by LWP filter 224. A small portion of light in the first wavelength band that is contained in reflected beam 240 is further attenuated by the LWP filter, as in the FIG. 2 embodiment. SWP filter 218 reflects beam 242 to produce beam 244 that is coincident with beam 236. As in the prior embodiment, SWP filter 218, in producing beam 244, further attenuates light in the first wavelength band. The optical set-up of the embodiment of FIG. 10 is straightforward. The alignment of the focused spots of both beams on the end of the return fiber is controlled independently by the two mirrors 220 and 222. The two optical paths are essentially identical, so that any differential modal effects are reduced or eliminated.

In an alternate arrangement, the material comprising LWP filter 224 is placed on or formed in the substrate of encoder 220, rather than on mirror 226. In a second alternate arrangement, encoder shaft 204 and encoders 200 and 202 are moved to the right with respect to the remaining elements of the sensor, such that tracks 206 and 208 lie in the paths of beams 242 and 234, respectively. Such an arrangement has the advantage that each beam makes one less pass through the encoder substrate. However, the embodiment illustrated in FIG. 10 may be preferred since for a given sensor outside diameter, the radii of the tracks will be larger, leading to a higher precision. In another possible arrangement, LWP filters could be used instead of SWP filters 216 and 218. However, the illustrated arrangement may be preferred since the LWP filter material is preferably an intrinsically absorbing glass. Provided that the absorption edge of the intrinsically absorbing glass is between the two wavelengths $\lambda_1$ and $\lambda_2$, the small fraction of light at $\lambda_1$ that is reflected by SWP filter 216 will be further absorbed, leading to improved separation of the two channels. Insofar as is known, no SWP intrinsically absorbing glass is commercially available. Therefore although LWP interference filters could be used instead of SWP filters 216 and 218, the lack of commercial availability of SWP intrinsically absorbing glass would lead to poorer isolation between the signal and reference channels.

In yet another arrangement, tracks 207 and 208 could replace mirrors 222 and 220, respectively, and the signal and reference beams could be reflected by the tracks rather than transmitted through the encoder disk. This arrangement would be simpler optically. However, run out and wobble of encoder shaft 204, and the perpendicularly of the encoders to the shaft would have to be controlled to a very high degree, since the image of the outgoing fiber projected on the return fiber would move as the shaft rotates, leading to a systematic error.

Analysis of the optical power and losses for the embodiment of FIG. 10 can be made in a manner similar to that shown in FIG. 6 for the FIG. 2 embodiment, except that reference path 132 is attenuated by a second encoder track. The received powers in the first and second wavelength bands may be written:

$$P_1 = P_{01}\alpha\beta\gamma_1 t_1 \quad (6)$$

$$P_2 = P_{02}\alpha\beta\gamma_2 t_2 \quad (7)$$

where the encoder track attenuations $t_1$ and $t_2$ are given above in Equations (4) and (5). Making the assumption that the two launched powers $P_{01}$ and $P_{02}$ are equal, and that the two path losses $\gamma_1$ and $\gamma_2$ can be made equal by an appropriate adjustment, the ratio of the difference of $P_1$ and $P_2$ to the sum of $P_1$ and $P_2$ is:

$$(P_1 - P_2)/(P_1 + P_2) = \left(1 - \frac{2\theta}{\theta_{max}}\right)\left(\frac{t_{max} - t_{min}}{t_{max} + t_{min}}\right) \quad (8)$$

Equation (8) can be solved for the angular displacement $\theta$, giving:

$$\theta = \frac{\theta_{max}}{2}\left[1 - \frac{P_1 - P_2}{P_1 + P_2} \cdot \frac{t_{max} + t_{min}}{t_{max} - t_{min}}\right] \quad (9)$$

There are a number of advantages that flow from the use of a differential sensor system. One advantage is that the angular sensitivity is doubled, so that errors introduced by any differential attenuation in the fiber lines and couplers are effectively halved. In addition, since the total number of encoder dots in the two beams will remain approximately constant, the size of the encoder track dots may be increased, and hence the mean number of dots in the aperture decreased. This means that the minimum dot density required so that the noise level does not exceed a maximum value at the lower dot density end of the track will be smaller than in the single track sensor. As a result, the dynamic range of the tracks may be increased, again leading to a reduction in the effect of any differential attenuation in the fiber links. In general, the sum of $P_1$ and $P_2$ should remain constant. Any change in the sum can be used as an indication of faults, such as a loss or a degradation of one of the channels.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A sensor for use in a two-wavelength, referenced optical sensing system, for determining a value of a measurand, the sensor comprising:
    wavelength sensitive beamsplitting means for receiving an optical input signal having first and second wavelength bands, and for forming therefrom first and second beams, the first beam containing a major portion of the optical input signal in the first wavelength band, and the second beam containing a major portion of the optical input signal in the second wavelength band;
    an encoder, the encoder including means for modulating the intensity of light by an amount that varies as the value of the measurand varies;
    wavelength sensitive modulation means for preferentially modulating the intensity of light in the first wavelength band in comparison to light in the second wavelength band; and
    optical path means for forming signal and reference paths for the respective first and second beams such that the first beam is modulated by the encoder to form a modulated first beam, and such that the second beam is modulated by the wavelength sensitive modulation means to form a modulated second beam, whereby the relative intensity of the modulated first beam with respect to the modulated second beam provides a measure of the value of the measurand.

2. The sensor of claim 1, wherein the beamsplitting means comprises a short wavelength pass filter having a cut-off wavelength between the first and second wavelength bands.

3. The sensor of claim 1, wherein the optical path means further comprises combining means for combining the modulated first and second beams into a single optical output signal.

4. The sensor of claim 3, wherein the combining means comprises a short wavelength pass filter having a cut-off wavelength between the first and second wavelength bands.

5. The sensor of claim 1, wherein the modulation means comprises a short wavelength, intrinsically absorbing material that transmits a major portion of light in the second wavelength band and absorbs a major portion of light in the first wavelength band.

6. The sensor of claim 1, wherein the measurand is a position of a movable member, and wherein the encoder is mechanically coupled to the movable member and includes a track along which transmittance varies with position, whereby the track attenuates the intensity of light passing through the track by an amount that varies as the movable member moves.

7. The sensor of claim 6, wherein the beamsplitting means comprises a first filter that transmits a major portion of light in the first wavelength band and reflects a major portion of light in the second wavelength band, the encoder being positioned such that light transmitted by the first filter strikes the track.

8. The sensor of claim 7, wherein the modulation means comprises means for transmitting a major portion of light in the second wavelength band and for absorbing a major portion of light in the first wavelength band.

9. The sensor of claim 8, wherein the optical path means further comprises combining means for combining the modulated first and second beams into a single optical output signal.

10. The sensor of claim 9, wherein the modulation means comprises a long wavelength pass intrinsically absorbing material and a mirror, the modulation means being positioned in the path of light reflected by the first filter such that light reflected by the modulation means strikes the combining means.

11. The sensor of claim 10, wherein the combining means comprises a second filter, and wherein the modulation means is approximately equidistant from both filters.

12. The sensor of claim 11, wherein the first and second filters are positioned on a first side of the encoder, and wherein the optical path means further comprises means for causing light passing through the track to pass through a portion of the encoder that does not include the track to reach the second filter.

13. The sensor of claim 6, wherein the encoder comprises mechanically coupled first and second tracks, transmittance varying with position along each track, wherein the optical path means includes means for forming the signal path such that the intensity of the first beam is modulated by the first track to form the modulated first beam, and for forming the reference path such that the intensity of the second beam is modulated by the second track and by the modulation means to form the modulated second beam.

14. The sensor of claim 13, wherein as the movable member moves, the encoder increases the attenuation of one of the beams and decreases the attenuation of the other beam.

15. The sensor of claim 13, wherein the modulation means comprises a short wavelength, intrinsically absorbing material that transmits a substantial portion of light in the second wavelength band and absorbs a substantial portion of light in the first wavelength band.

16. The sensor of claim 15, wherein the beamsplitting means comprises a first filter that transmits a major portion of light in the first wavelength band and reflects a substantial portion of light in the second wavelength band, the first track being positioned such that light transmitted by the first filter strikes the first track, and the second track being positioned such that light reflected by the first filter strikes the second track.

17. The sensor of claim 16, wherein the encoder comprises spaced-apart, mutually parallel first and second members on which the first and second tracks are positioned.

18. A two-wavelength reference optical sensing system for determining a value of a measurand, the sensor comprising:
means for producing an optical input signal having first and second wavelength bands;
wavelength sensitive beamsplitting means for receiving the optical input signals and for forming therefrom first and second beams, the first beam containing a major portion of the optical input signal in the first wavelength band, and the second beam containing a major portion of the optical input signal in the second wavelength band;
an encoder, the encoder including means for modulating the intensity of light by an amount that varies as the value of the measured varies;
wavelength sensitive modulation means for preferentially modulating the intensity of light in the first wavelength band in comparison to light in the second wavelength band;
optical path means for forming signal and reference paths for the respective first and second beams such that the first beam is modulated by the encoder to form a modulated first beam, and such that the second beam is modulated by the wavelength sensitive modulation means to form a modulated second beam, whereby the relative intensity of the modulated first beam with respect to the modulated second beam provides a measure of the value of the measurand;
combining means for combining the modulated first and second beams into a single optical output signal; and
detection means including means for receiving the optical output signal, and means for determining the relative intensity of light in the first wavelength band with respect to light in the second wavelength band to thereby providing a measure of the value of the measurand.

* * * * *